(12) United States Patent
Martin et al.

(10) Patent No.: US 9,347,743 B2
(45) Date of Patent: *May 24, 2016

(54) OFFSET APERTURE DUAL-GIMBALED OPTICAL SYSTEM

(71) Applicant: Raytheon Company, Waltham, MA (US)

(72) Inventors: Chadwick B. Martin, Tucson, AZ (US); David J. Knapp, Tucson, AZ (US); Gregory P. Hanauska, Tucson, AZ (US)

(73) Assignee: Raytheon Company, Waltham, MA (US)

(*) Notice: Subject to any disclaimer, the term of this patent is extended or adjusted under 35 U.S.C. 154(b) by 213 days.

This patent is subject to a terminal disclaimer.

(21) Appl. No.: 13/944,378

(22) Filed: Jul. 17, 2013

(65) Prior Publication Data

US 2015/0022874 A1    Jan. 22, 2015

(51) Int. Cl.
| G02B 27/00 | (2006.01) |
| F41G 7/22 | (2006.01) |
| F41G 7/26 | (2006.01) |
| F41G 7/20 | (2006.01) |
| G02B 26/10 | (2006.01) |

(52) U.S. Cl.
CPC ............... *F41G 7/2213* (2013.01); *F41G 7/20* (2013.01); *F41G 7/22* (2013.01); *F41G 7/2293* (2013.01); *F41G 7/26* (2013.01); *G02B 26/101* (2013.01); *G02B 27/0025* (2013.01)

(58) Field of Classification Search
CPC ..... G02B 27/0025; G02B 26/101; F41G 7/20; F41G 7/22; F41G 7/26
USPC ......................................................... 359/226
See application file for complete search history.

(56) References Cited

U.S. PATENT DOCUMENTS

| 5,418,364 | A | * | 5/1995 | Hale et al. ...................... 250/334 |
| 6,028,712 | A |   | 2/2000 | McKenney et al. |
| 6,310,730 | B1 | * | 10/2001 | Knapp et al. ................... 359/642 |
| 6,313,951 | B1 |   | 11/2001 | Manhart et al. |
| 6,356,396 | B1 |   | 3/2002 | Chen et al. |
| 7,042,654 | B2 |   | 5/2006 | Knapp |
| 7,145,734 | B2 |   | 12/2006 | Sparrold |
| 2011/0084195 | A1 | * | 4/2011 | Schaub et al. .............. 250/203.2 |
| 2012/0085895 | A1 | * | 4/2012 | Martin et al. ................. 250/229 |

* cited by examiner

*Primary Examiner* — Thomas K Pham
*Assistant Examiner* — Mitchell Oestreich
(74) *Attorney, Agent, or Firm* — Eric A. Gifford (57) ABSTRACT

An offset aperture two-axis gimbaled optical system comprises a two-axis gimbal and an optics assembly that is mounted on the inner gimbal and offset radially from the rotation axis of the outer gimbal. The optics assembly is suitably offset so that its optical aperture does not overlap the rotation axis of the outer gimbal and its optical aperture is symmetric about the rotation axis of the inner gimbal. In different applications, the offset aperture provides for reduced optical aberrations and improved utilization of the available packaging volume to accommodate multiple offset aperture optics assemblies.

16 Claims, 10 Drawing Sheets

OFFSET APERTURE DUAL-GIMBALED OPTICAL SYSTEM

BACKGROUND OF THE INVENTION

1. Field of the Invention

This invention relates to dual-gimbaled optical systems such as roll-nod gimbal optical systems, and more particularly to dual-gimbaled optical system having an offset aperture.

2. Description of the Related Art

A dual-gimballed optical system includes an outer gimbal configured to rotate around a first axis, an inner gimbal mounted on the outer gimbal and configured to rotate around a second axis and an optics assembly mounted on the inner gimbal. Typical dual-gimbal configurations include roll/nod, nod/roll, pitch/yaw or Az/El. The optics assembly has a field-of-view (FOV). The dual-gimbal is configured to slew the FOV to trace out a much larger field-of-regard (FOR). The optics assembly is optically coupled to an optical sensor or an optical source. In some systems, the source or sensor may be positioned on the gimbal. In others, the source or sensor is positioned off gimbal.

Figure 1A:
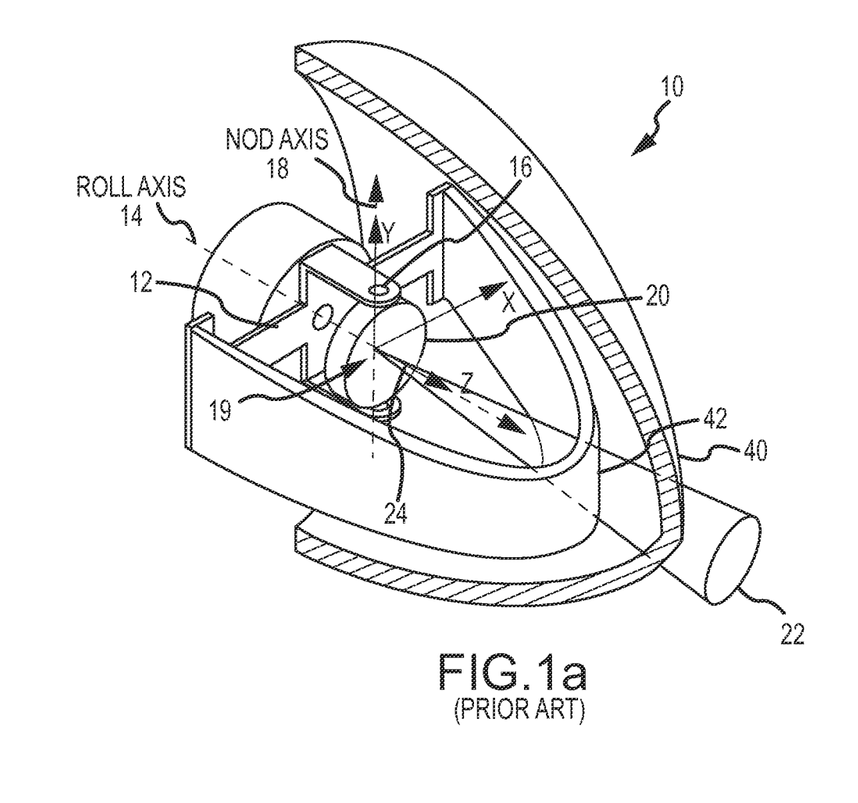
FIGS. 1a-1c, as described above, are diagrams of a roll-nod optical assembly whose aperture is symmetric about both the roll and nod axes, its Coudé path to an off gimbal optical sensor and the field-of-regard (FOR) traced by the optical assembly.
Figure 1B:
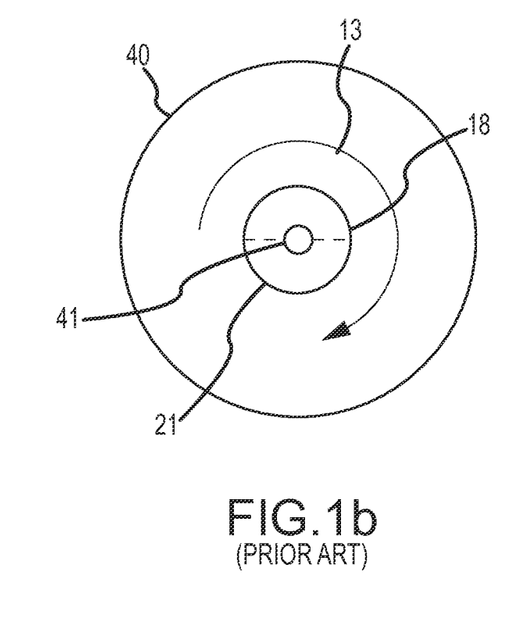
Figure 1C:
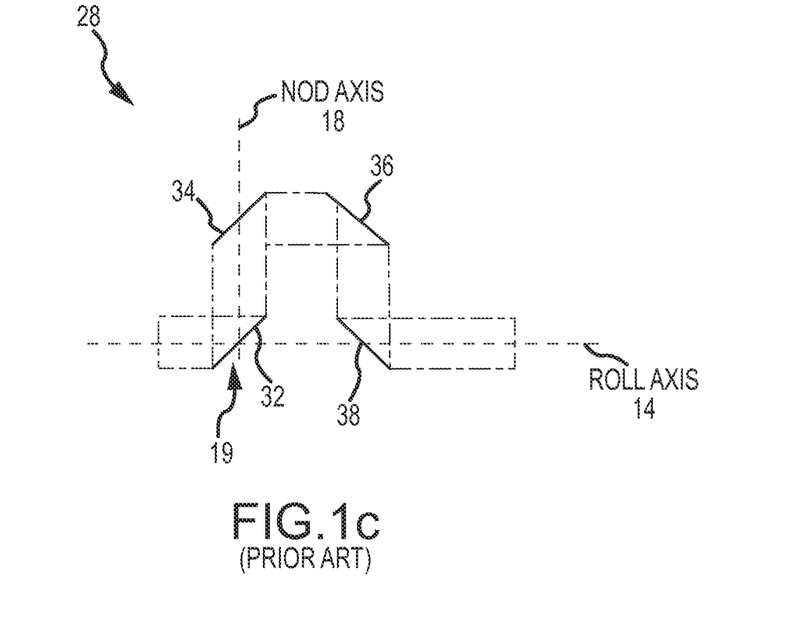

As shown in FIGS. 1a through 1c, a dual-gimbaled optical system 10 comprises a roll gimbal 12 that rotates 13 around a roll axis 14, a nod gimbal 16 on the roll gimbal that rotates around a nod axis 18 perpendicular to the roll axis at the gimbal center 19, an optics assembly 20 with its optical collection aperture 21 centered on the nod gimbal and symmetric about both the roll and nod axes and a sensor or source (not shown) optically coupled to the optics assembly. The roll and nod gimbals are shown schematically, each gimbal includes a mechanical rotation axis, a motor to provide rotation about the rotation axis and a controller to control the motor. The optics assembly transmits or receives optical radiation in a FOV 22 along an optical axis 24. The dual-gimbal points optical axis 24 in a multi-dimensional space defined by the first and second axes to slew the FOV over a FOR such as a hemisphere.

When the source or sensor is positioned off-gimbal, light is optically coupled between the source or sensor and the optics assembly via a Coudé path 28. Coudé path 28 includes four folding mirrors 32, 34, 36 and 38 that fold light between the optics assembly and the roll axis to the off-gimbal source or sensor. The first folding mirror 32 may be incorporated in the optics assembly on the nod gimbal. The second, third and fourth folding mirrors may be formed in a prism.

In many systems, the dual-gimbaled optical system is positioned behind a dome 40. The dome is optically transparent to the spectral band received and/or transmitted by the optical system and provides protection for the optical components. The dome has an inner curvature that is symmetric about the roll axis. From an optical aberration correction perspective, the dome should be flat or spherical in shape.

If the dome is non-spherical, highly curved, or thick, the dome may introduce significant wavefront aberration into the optical rays that pass through the dome, particularly at or near the tip 41 of the dome. These domes are typically referred to as a "conformal" dome. Conformal means that the dome conforms to a desired shape for some reason other than optical correction. Conformal domes are neither flat nor spherical. Some examples of conformal shapes include ogive or steep ellipse. Conformal domes present significant advantages in aerodynamic performance, and possibly aesthetics, while presenting greater optical challenges. The conformal dome may be mounted on various platforms such as missiles, airplanes, unmanned aerial vehicles (UAVs), helicopters, terrestrial or sea-based vehicles and may be mounted forward, aft, sideways or on the belly of the platform. The axis of symmetry of the dome may be coincident with or orthogonal to a long axis of the platform.

Conformal domes present significant advantages in aerodynamic performance while presenting greater optical challenges. A transparent optical corrector 42 in the form of an aspheric transparent arch having a shape responsive to the shape of the dome may be placed on the roll gimbal in the optical path between the conformal dome 40 and the optics assembly 20 to compensate for the aberrations introduced by the non-spherical window. The arch is fixed with respect to the nod axis. As the arch rotates with the roll gimbal, the transparent arch is suitably designed to just cover the FOV over all allowed nods of the nod gimbal. An embodiment of the transparent arch corrector 42 is described in detail in U.S. Pat. No. 6,028,712. An embodiment of a "half-arch corrector" is described in U.S. Pat. No. 6,310,730. The "half-arch" corrector is lighter weight than the "arch" corrector but limits the nod range of motion and requires the optical train to roll an extra 180 degrees to cover the nod range in order to cover the same FOR.

In certain missile systems it is required that the FOR look both forwards and down. The optics assembly is typically mounted on a nod/roll gimbal behind a flat window and a conformal dome. To accommodate this requirement, the optics assembly is offset from the nod axis so that the optical aperture is completely off of the nod axis. The aperture is symmetric about the roll axis.

In certain missile countermeasures systems, a large aperture receive optics assembly is mounted on a central region of the nod gimbal symmetric about the roll and nod axis to receive optical radiation from a target. The received optical radiation is coupled to an off-gimbal detector. A small aperture transmit optics assembly is mounted on an offset region of the nod gimbal such that the aperture of the transmit optics is completely offset from both the roll and nod axes. The range of motion in nod is limited due to mechanical clearances of the optics package.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an offset aperture two-axis gimbaled optical system. In different applications, the offset aperture provides for reduced optical aberrations and improved utilization of the available packaging volume to accommodate multiple offset aperture optics assemblies.

In an embodiment, a two-axis gimbaled optical system comprises an outer gimbal configured to rotate around a first rotation axis and an inner gimbal on the outer gimbal, the inner gimbal configured to rotate around a second rotation axis. A projection of the first rotation axis onto a common plane containing the second rotation axis along a common perpendicular to the second rotation axis is perpendicular to the second rotation axis. In different cases, the rotation axes may be perpendicular to each other or skew. Two-axis configurations include but are not limited to roll/nod, nod/roll, pitch/yaw and Az/El. An optics assembly is mounted on the inner gimbal. The optics assembly is configured with an optical aperture to transmit or receive optical radiation in a field-of-view (FOV) along an optical axis to trace a field-of-regard (FOR). The optics assembly is offset radially from the first rotation axis such that the entire optical aperture is offset from the first rotation axis and the optical aperture is symmetric about the second rotation axis. Any and all optics assemblies that are mounted on the inner gimbal are offset radially from the first rotation axis. A transmitter or sensor, on or off gimbal, is optically coupled to each optics assembly.

In an embodiment, a second optics assembly is mounted on an inner gimbal and is configured with an optical aperture to transmit or receive optical radiation along a second optical axis. The second optics assembly and its optical axis are offset radially from the first rotation axis. In one embodiment, the first and second optics assemblies rotate about the same second rotation axis in which case they may be mounted on a common inner gimbal. In another embodiment, the first and second optics assemblies rotate about different second and third rotation axes in which case they are mounted on different inner gimbals each mounted on the outer gimbal at their respective offset positions. In an embodiment, the entire optical aperture is offset from the first rotation axis and the optical aperture is symmetric about the second rotation axis. In an embodiment in which the first and second rotation axes lie in the same plane (i.e. are perpendicular to each other), the first and second optics assemblies are offset radially along the second axis on opposite sides of and may be equidistant to the first axis.

In an embodiment, the two-axis gimbaled optical system is positioned behind a conformal dome whose inner and outer curvatures are symmetric about a central axis. The optics assembly is configured with the first rotation axis of the outer gimbal coincident with the central axis of the dome to rotate about the first and second rotation axes such that its FOV does not cross the central axis within the conformal dome, hence the "tip" of the conformal dome. The "tip" may create a discontinuity that is difficult to correct for optically. The offset aperture avoids this discontinuity without sacrificing FOR.

In embodiments in which the optical system is positioned behind a conformal dome, the system may further comprise an optical corrector mounted on the outer gimbal to correct for the aberrations induced by the conformal dome. The optical corrector is positioned adjacent the curved inner surface of the conformal dome in an optical path between the dome and the optics assembly as the inner gimbal rotates about the second rotation axis. The optical corrector rotates about the first rotation axis on the outer gimbal and is fixed with respect to the second rotation axis. The optical corrector comprises an aspheric transparent arch having an optical corrector shape and position responsive to a shape of the dome at the offset position of the optics. The precise optical corrector shape is dictated by the relationship of the inner and outer gimbals and the radial offset of the optics assembly as well as the dome and corrector materials, waveband of the optical system, dome shape and thickness, aperture size, etc.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an offset aperture two-axis gimbaled optical system. In different applications, the offset aperture provides for reduced optical aberrations and improved utilization of the available packaging volume to accommodate multiple offset aperture optics assemblies.

Embodiments of the offset aperture two-axis gimbaled optical system will be described in the context of a roll/nod gimbal. The roll gimbal and roll axis are a specific example of an outer gimbal and first rotation axis and the nod gimbal and nod axis are a specific example of an inner gimbal (mounted on the outer gimbal) and the second rotation axis. As will be apparent to one of ordinary skill in the art the offset aperture may be implemented in many other dual-gimbal configurations including but not limited to nod/roll, pitch/yaw and Az/El provided that relationship of the rotation axes of the inner and outer gimbals and the offset aperture satisfy a criteria. In many embodiments, the "gimbals" are depicted schematically. One skilled in the art will understand that a gimbal includes a mechanical rotation axis, a motor to product rotation about that axis and a controller to control the motor.

The optics assemblies mounted on the inner gimbal may receive or transmit radiation or both. The optics assemblies may comprise single or compound optical lens/mirror systems. The optics assemblies are modified to account for the path lengths due to the offset aperture. The optics assemblies are designed to meet collection area and FOV requirements. The assembly may be designed for an on-gimbal detector (source) or to transfer the image through a coudé path to an off-gimbal detector (source).

Embodiments of the offset aperture two-axis gimbaled optical system will be described in conjunction with a conformal dome and an optical corrector to correct for aberrations induced by the conformal dome. One skilled in the art will appreciate that either a single optical corrector or multiple nested optical correctors (same symmetry but different shape) may be used to correct for aberrations. One skilled in the art will appreciate that the offset aperture may be configured for use in applications in which the dome is flat or hemispheric or in applications without any dome or window.

The offset aperture two-axis gimbaled optical system is typically mounted on a platform. The platform may be stationary or moving in the case of terrestrial, sea or air vehicles including but not limited to missiles, rockets, guided projectiles, UAVs, helicopters or airplanes. In embodiments including a dome, the dome may be symmetrical about a roll axis in the direction of motion of the platform. Alternately, the dome may be symmetrical about an axis that is not in the direction of motion of the platform. In either case, the dome must be symmetric about the first rotation axis of the outer gimbal regardless of the gimbal type (roll/nod, ax/el, pitch/yaw, etc.), or alternately stated the first rotation axis of the outer gimbal must be coincident with the axis of symmetry of the dome.

In different missile embodiments, the dome is typically 2 inches to 8 inches in diameter. The optical apertures are typically 1 inch to 6 inches in diameter. In other embodiments such as may be mounted on an airplane or a UAV the dome and aperture sizes may be larger.

The basic construct of the offset aperture two-axis gimbaled optical system includes a roll gimbal configured to rotate about a roll axis, a nod gimbal mounted on the roll gimbal and configured to rotate about a nod axis, and an optics assembly mounted on the nod gimbal with the assembly's optical aperture offset radially from the roll axis. As depicted in embodiments, the preferred configuration is for the entire optical aperture to be offset from the roll axis and symmetric about the nod axis. In different embodiments, one or more of the optical assemblies may be offset so that the optical aperture partially overlaps the roll axis or is not symmetric about the nod axis.

Figure 2A:
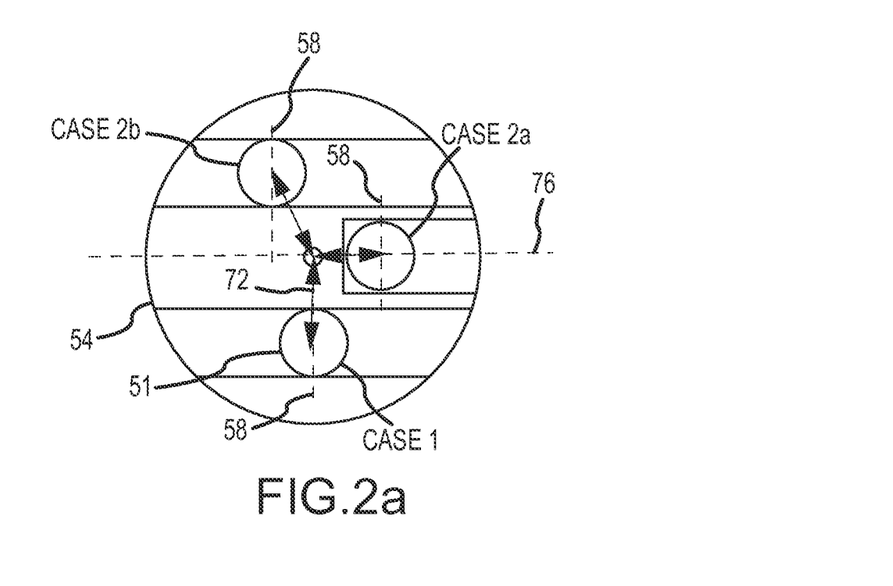
FIGS. 2a-2c are diagrams illustrating three different configurations of dual-gimbaled optical sensors having an offset aperture that is entirely offset from the roll axis and symmetric about the nod axis.
Figure 2B:
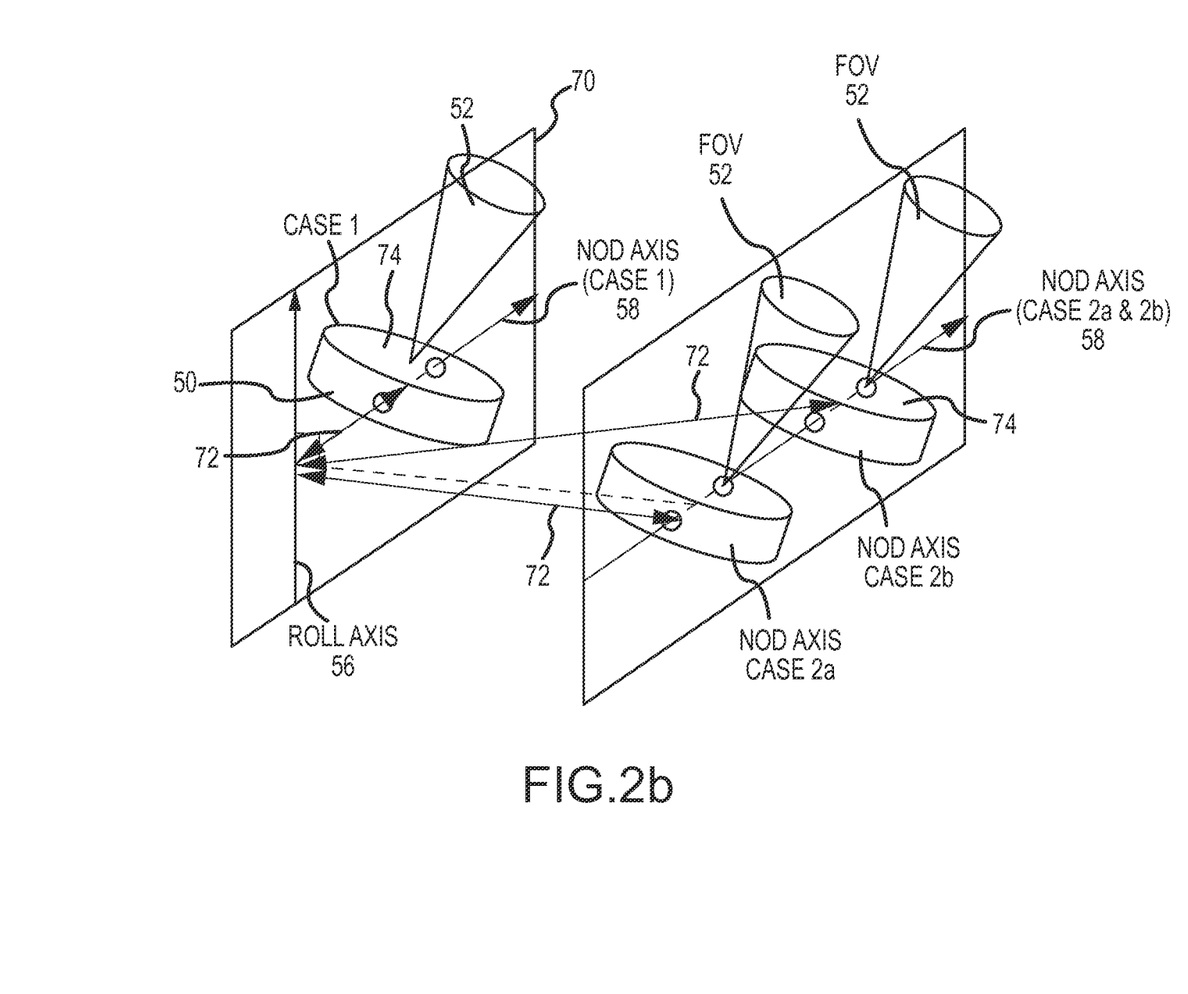
Figure 2C:
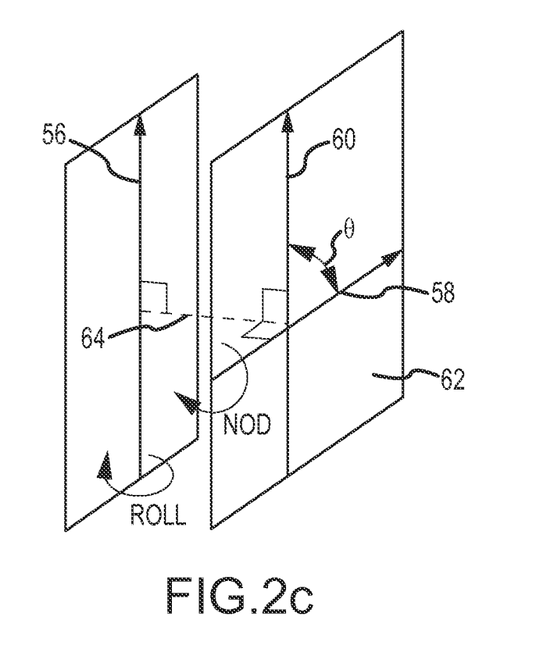

Referring now to FIGS. 2a through 2c, given an optics assembly 50 with a collection aperture 51 having limited FOV 52 shown behind a dome 54, in order for the FOV 52 to be able to look straight ahead and to trace a desired FOR (such as a hemisphere, conic portion of a hemisphere or a hyperhemisphere), the relative orientation of roll and nod axes 56 and 58 must satisfy the following criterion: a projection 60 of roll axis 56 onto a plane 62 containing nod axis 58 along a common perpendicular 64 to the roll and nod axes must be perpendicular to the nod axis 56 (i.e. $\Theta=90$ degrees). Satisfaction of this criterion insures that there is no gap in the FOR.

There are two different cases that satisfy the criterion, a first being for perpendicular roll and nod axes that lie in the same plane and second being for a subset of skew roll and nod axes. The second case has two distinct sub-cases.

In case 1, roll and nod axes 56 and 58 lie in a common plane 70 and are perpendicular to each other within common plane 70. A conventional roll/nod gimbal is an example of case 1. Optics assembly 50 is offset radially from roll axis 56 by an offset distance 72 with its optical aperture 74 symmetric about nod axis 58. Offset distance 72 is the radial distance from the roll axis to the center of the optical aperture.

In case 2, roll and nod axes 56 and 58 are "skew", the axes do not intersect and are not parallel. Optics assembly 50 is offset radially from roll axis 56 by an offset distance 72 with its optical aperture 74 symmetric about nod axis 58. In this case, the nod gimbal itself is offset on the roll gimbal. In sub-case 2a, a plane 76 that contains roll axis 56 and is perpendicular to the nod axis 58 bisects optical aperture 74. In sub-case 2b, optical aperture 74 is offset from plane 76.

An embodiment of an offset aperture dual-gimbaled optical system 100 in a case 1 configuration is illustrated in FIGS. 3a-3c and 4a-4c. This system may be mounted on a missile body such that the axis of symmetry (z-axis) of the conformal dome 102 is coincident with the roll axis 104 of the missile and the dual-gimbaled optical system.

Figure 3A:
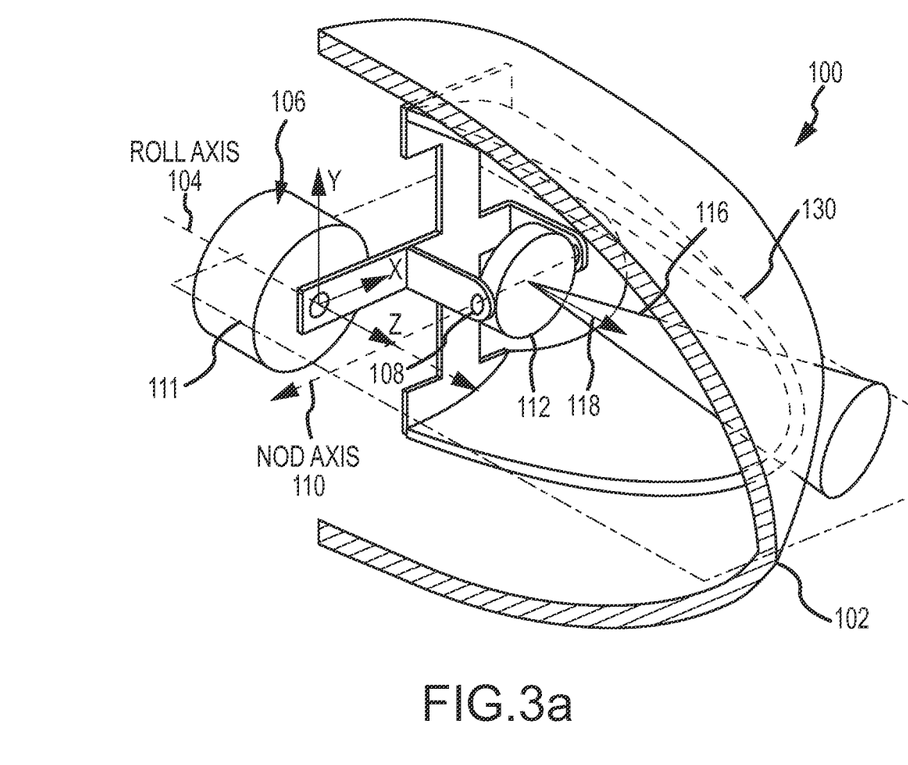
FIGS. 3a-3c are diagrams of an embodiment of a first configuration of a roll/nod optical assembly having an offset aperture, its Coudé path to an off gimbal optical sensor and the field-of-regard (FOR) traced by the optical assembly.
Figures 4A, 4B, 4C:
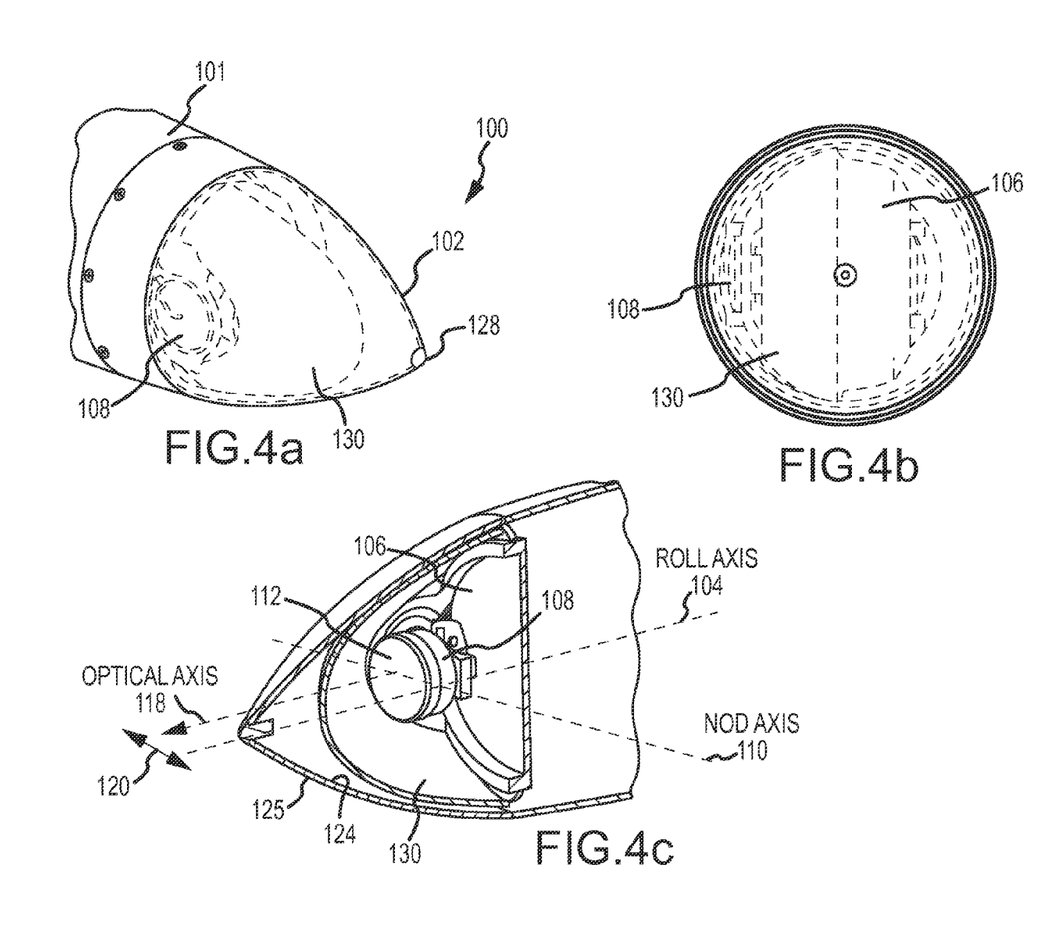
FIGS. 4a-4c are diagrams of the embodiment of the first configuration.

System 100 comprises a roll gimbal 106 configured to rotate around roll axis 104 and a nod gimbal 108 on roll gimbal 106, the nod gimbal configured to rotate around a nod axis 110. As defined for case 1, the roll and nod axes 104 and 110 are perpendicular to each other in a common plane 111.

Figure 3B:
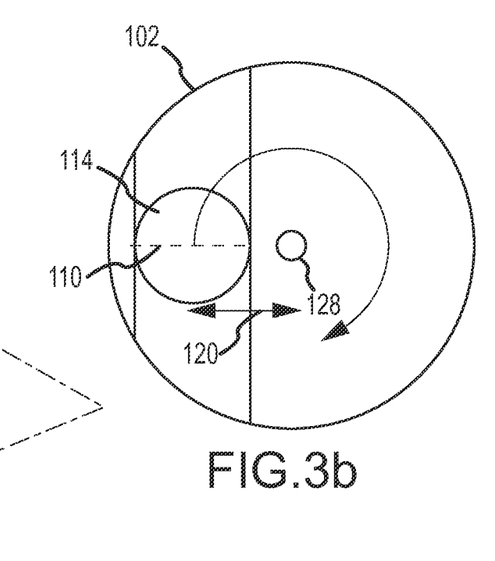
Figure 3C:
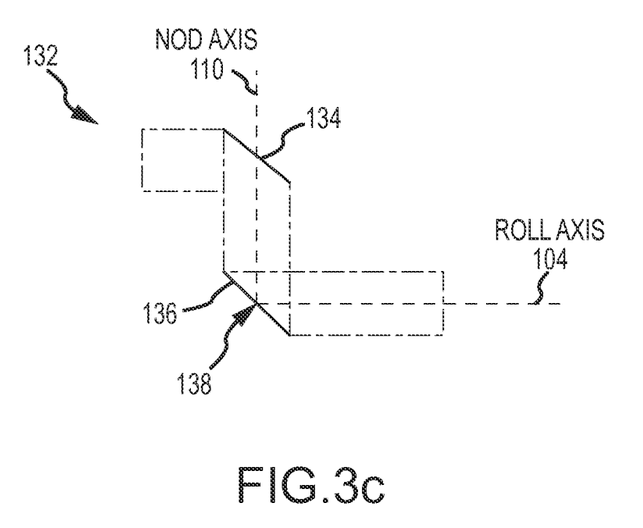

A first optics assembly 112 is mounted on nod gimbal 108. First optics assembly 112 is configured with an optical aperture 114 to transmit or receive optical radiation in a field-of-view (FOV) 116 along a first optical axis 118. First optics assembly 112 is offset radially from roll axis 104 by an offset distance 120 such that the entire optical aperture 114 is offset from roll axis 104 and the optical aperture 114 is symmetric about nod axis 110. The roll/nod gimbal rotates about the roll and nod axes to trace the FOV 116 over a field-of-regard (FOR) 122. A transmitter or sensor (not shown) is optically coupled to first optics assembly 112.

Conformal dome 102 is mounted on missile body 101 in front of roll/nod gimbal and optics assembly. Conformal dome 102 has a curved inner surface 124 and a curved outer surface 125 that are symmetric about roll axis 104 and form a "tip" 128 on the roll axis. The optics assembly is configured to rotate about the roll and nod axes such that its FOV 116 does not cross the roll axis within the conformal dome, hence the "tip" 128 of the conformal dome. The "tip" or an extruded forebody that extends forward from the dome along the central axis may create a discontinuity that is difficult to correct for optically depending on the desired nosecone shape. The offset aperture avoids this discontinuity without sacrificing FOR.

An optical corrector 130 is mounted on roll gimbal 106. The optical corrector is adjacent the curved inner surface 124 of the conformal dome 102 in an optical path between the dome and the first optics assembly 112 that encompasses the FOV 116 as the nod gimbal 108 rotates about the nod axis 110. The optical corrector rotates about the roll axis on the roll gimbal and is fixed with respect to the nod axis. The optical corrector comprises an aspheric transparent arch having an optical corrector shape and position responsive to a shape of the dome 102 at the offset position of the first optics assembly 112. For case 1, the optical corrector shape is a full-arch that is only symmetric about common plane 111. This optical corrector provides for a full range of motion in roll and nod, i.e. the roll gimbal can rotate 360 degrees about the roll axis 104 and the nod gimbal can rotate in both plus and minus directions about the nod axis 110 to meet the desired FOR.

When the source or sensor is positioned off-gimbal, light is optically coupled between the source or sensor and the optics assembly 112 via a Coudé path 132. Coudé path 132 requires only two fold mirrors 134 and 136 that fold light between the optics assembly and the roll axis 104 to the off-gimbal source or sensor. The first folding mirror 134 may be incorporated in the optics assembly 102 on the nod gimbal. The second folding mirror 136 is placed at the gimbal center 138.

In embodiments, any and all other optics assemblies that are mounted on the nod gimbal 108 are offset radially from the roll axis 104. For case 1, a second optics assembly may be offset radially from the roll axis such that both the first and second optics assemblies are offset radially along the same nod axis on opposite sides of (and may be equidistant to) the roll axis with both assemblies symmetric about the nod axis. Generally speaking, the second optics assembly could be any of case 1, 2a or 2b, may be partially or fully offset from the roll axis and may, may not be symmetric about the nod axis, and may or may not share the same nod axis as the first optics assembly. If the optics assemblies share the same nod axis they may be mounted on a common inner gimbal. If the optic assemblies rotate about different nod axes they are mounted on different inner gimbals each mounted on the outer gimbal at their respective offset positions.

Figures 5A, 5B:
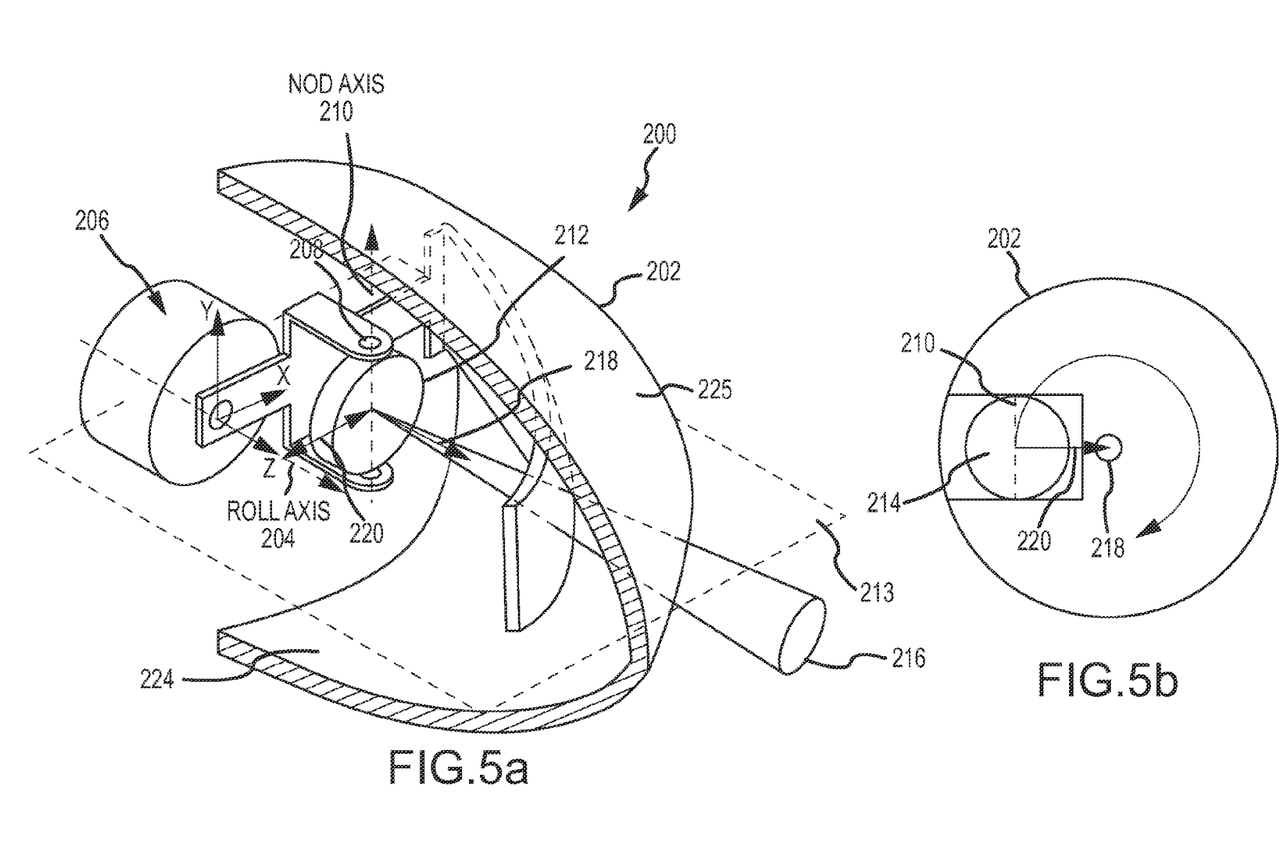
FIGS. 5a-5b are diagrams of an embodiment of a second configuration of a roll/nod optical assembly having an offset aperture and the field-of-regard (FOR) traced by the optical assembly.

An embodiment of an offset aperture dual-gimbaled optical system 200 in a case 2a configuration is illustrated in FIGS. 5a-5b. This system may be mounted on a missile body (not shown) such that the axis of symmetry (z-axis) of the conformal dome 202 is coincident with the roll axis 204 of the missile and the dual-gimbaled optical system.

System 200 comprises a roll gimbal 206 configured to rotate around roll axis 204 and a nod gimbal 208 on roll gimbal 206, the nod gimbal configured to rotate around a nod axis 210. As defined for case 2a, the roll and nod axes 204 and 210 are skew with a plane containing roll axis 204 perpendicular to nod axes 210.

A first optics assembly 212 is mounted on nod gimbal 208. First optics assembly 212 is configured with an optical aperture 214 to transmit or receive optical radiation in a field-of-view (FOV) 216 along a first optical axis 218. First optics assembly 212 is offset radially from roll axis 204 by an offset distance 220 such that the entire optical aperture 214 is offset from roll axis 204 and the optical aperture 214 is symmetric about nod axis 210. The roll/nod gimbal rotates about the roll and nod axes to trace the FOV 216 over a FOR. A transmitter or sensor (not shown) is optically coupled to first optics assembly 212.

Conformal dome 202 is mounted on the missile body in front of roll/nod gimbal and optics assembly. Conformal dome 202 has curved inner and outer surfaces 224 and 225 that are symmetric about roll axis 204 and forms a "tip" 228 on the roll axis. The optics assembly is configured to rotate about the roll and nod axes such that its FOV 216 does not cross the roll axis within the conformal dome, hence the "tip" 228 of the conformal dome.

An optical corrector 230 is mounted on the roll gimbal 206. The optical corrector is adjacent the curved inner surface 224 of the conformal dome 202 in an optical path between the dome and the first optics assembly 212 that encompasses the FOV 216 as the nod gimbal 208 rotates about the nod axis 210. The optical corrector rotates about the roll axis on the roll gimbal and is fixed with respect to the nod axis. The optical corrector comprises an aspheric transparent arch having an optical corrector shape and position responsive to a shape of the dome 202 at the offset position of the first optics assembly 212. For case 2a, the optical corrector shape is an approximate half-arch that is only symmetric about a plane 213 in which said roll axis lies and that is orthogonal to nod axis. This optical corrector provides for a full range of motion in roll and half range of motion in nod, i.e. the roll gimbal can rotate 360 degrees about the roll axis 204 and the nod gimbal can rotate half of the nod FOR about the nod axis 210 away from roll axis 204 without major performance impact. To achieve the full range of motion in nod to cover the entire FOR, the system must roll 180 degrees.

In embodiments, any and all other optics assemblies that are mounted on the nod gimbal 208 are offset radially from the roll axis 204. For case 2a, in one embodiment a second optics assembly may be offset radially from the roll axis such both the first and second optics assemblies are offset radially along parallel nod axes on opposite sides of (and may be equidistant to) the roll axis with both assemblies symmetric about their respective nod axis. Generally speaking, the second optics assembly could be any of case 1, 2a or 2b, may be partially or fully offset from the roll axis, may or may not be symmetric about the nod axis, and may or may not share the same nod axis as the first optics assembly. If the optics assemblies share the same nod axis they may be mounted on a common inner gimbal. If the optic assemblies rotate about different nod axes they are mounted on different inner gimbals each mounted on the outer gimbal at their respective offset positions.

Figure 6A:
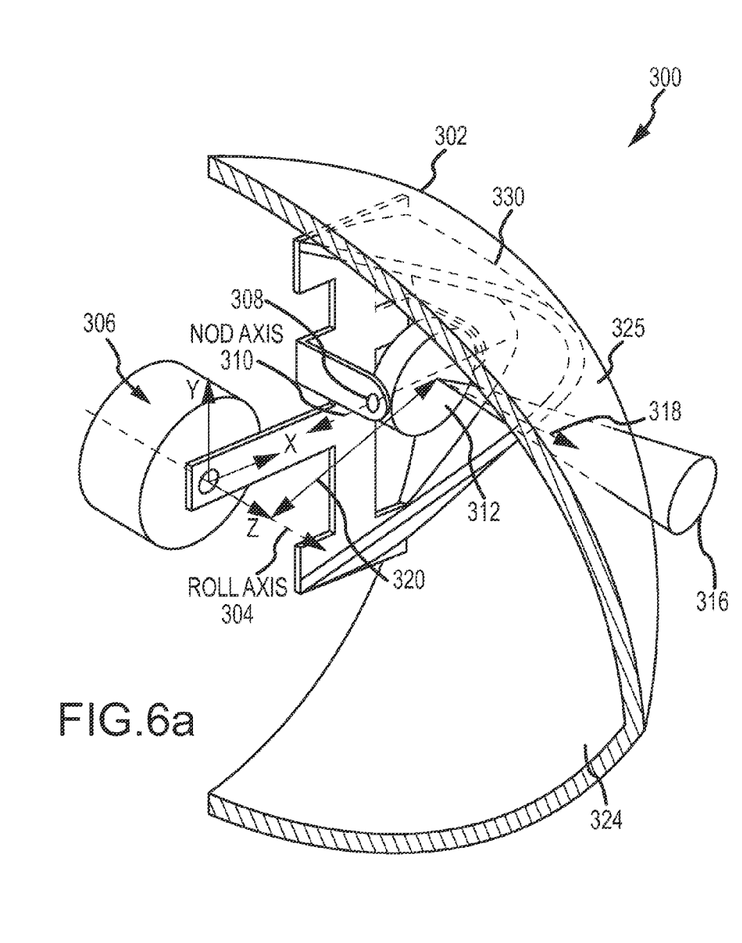
FIGS. 6a-6b are diagrams of an embodiment of a third configuration of a roll/nod optical assembly having an offset aperture and the field-of-regard (FOR) traced by the optical assembly.
Figure 6B:
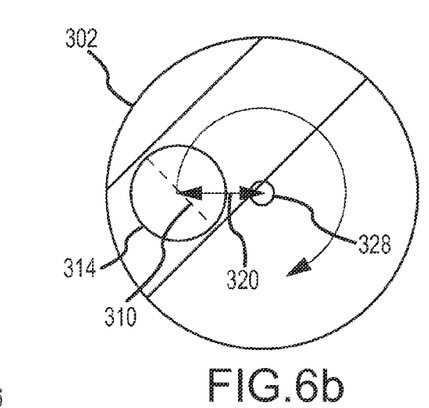

An embodiment of an offset aperture dual-gimbaled optical system 300 in a case 2b configuration is illustrated in FIGS. 6a-6b. This system may be mounted on a missile body (not shown) such that the axis of symmetry (z-axis) of the conformal dome 302 is coincident with the roll axis 304 of the missile and the dual-gimbaled optical system.

System 300 comprises a roll gimbal 306 configured to rotate around roll axis 304 and a nod gimbal 308 on roll gimbal 306, the nod gimbal configured to rotate around a nod axis 310. As defined for case 2b, the roll and nod axes 304 and 310 are skew.

A first optics assembly 312 is mounted on nod gimbal 308. First optics assembly 312 is configured with an optical aperture 314 to transmit or receive optical radiation in a field-of-view (FOV) 316 along a first optical axis 318. First optics assembly 312 is offset radially from roll axis 304 by an offset distance 320 such that the entire optical aperture 314 is offset from roll axis 304 and the optical aperture 314 is symmetric about nod axis 310. The roll/nod gimbal rotates about the roll and nod axes to trace the FOV 316 over a FOR. A transmitter or sensor (not shown) is optically coupled to first optics assembly 312.

Conformal dome 302 is mounted on the missile body in front of roll/nod gimbal and optics assembly. Conformal dome 302 has curved inner and outer surfaces 324 and 325 that are symmetric about roll axis 304 and forms a "tip" 328 on the roll axis. The optics assembly is configured to rotate about the roll and nod axes such that its FOV 316 does not cross the roll axis within the conformal dome, hence the "tip" 328 of the conformal dome. The "tip" creates a discontinuity that is difficult to correct for optically. The offset aperture avoids this discontinuity without sacrificing FOR 322.

An optical corrector 330 is mounted on roll gimbal 306. The optical corrector is adjacent the curved inner surface 234 of the conformal dome 302 in an optical path between the dome and the first optics assembly 312 that encompasses the FOV 316 as the nod gimbal 308 rotates about the nod axis 310. The optical corrector rotates about the roll axis on the roll gimbal and is fixed with respect to the nod axis. The optical corrector comprises an aspheric transparent arch having an optical corrector shape and position responsive to a shape of the dome 302 at the offset position of the first optics assembly 312. For case 2b, the optical corrector shape is a fully asymmetric arch. This optical corrector provides for a full range of motion in roll and nod, i.e. the roll gimbal can rotate 360 degrees about the roll axis 304 and the nod gimbal can rotate plus/minus 90 degrees.

In embodiments, any and all other optics assemblies that are mounted on the nod gimbal 308 are offset radially from the roll axis 304. Generally speaking, the second optics assembly could be any of case 1, 2a or 2b, may be partially or fully offset from the roll axis, may or may not be symmetric about the nod axis, and may or may not share the same nod axis as the first optics assembly. If the optics assemblies share the same nod axis they may be mounted on a common inner gimbal. If the optic assemblies rotate about different nod axes they are mounted on different inner gimbals each mounted on the outer gimbal at their respective offset positions.

Figure 7A:
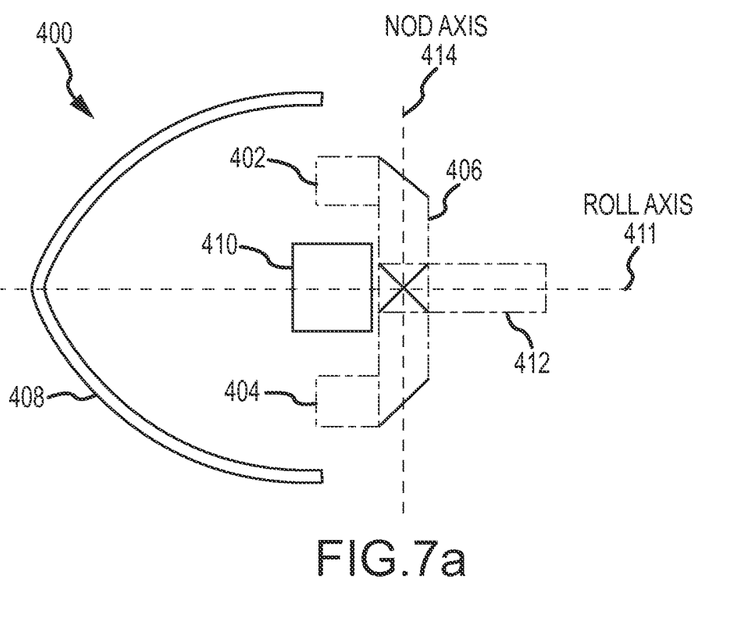
FIGS. 7a and 7b are side and end on views of an embodiment of a roll/nod gimbal having a pair of optical assemblies that are offset and an off-gimbal on-axis sensor.
Figure 7B:
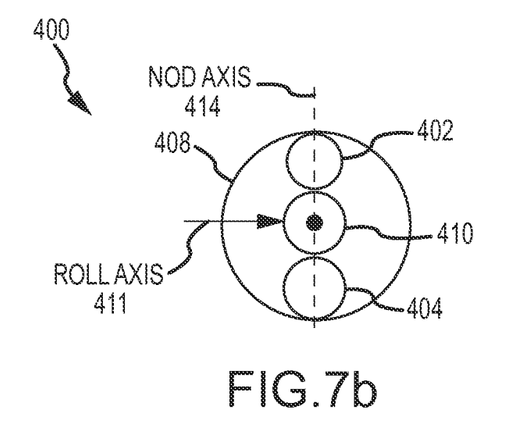

In an embodiment shown in FIGS. 7a and 7b, an offset aperture dual-gimbaled optical system 400 includes first and second optics assemblies 402 and 404 mounted on a roll/nod gimbal 406 behind a conformal dome 408 and an off-gimbal optics assembly 410 mounted between the first and second optics assemblies 402 and 404. Assembly 410 may be mounted on the roll gimbal or on neither gimbal. The optics assemblies may share a common optics sub-assembly 412. In this embodiment, optics assembles 402 and 404 are mounted on and symmetric about nod axis 414 on the nod gimbal to nod together. Alternately, the optics assemblies could be mounted on different nod gimbals to nod independently. Generally speaking, the first and second optics assemblies can be any combination of cases 1, 2a and 2b, may be partially or fully offset from the roll axis and may or may not be symmetric about the nod axis.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A two-axis gimbaled optical system, comprising:
   a dome that is symmetric about a first rotation axis;
   an outer gimbal positioned behind the dome, said outer gimbal configured to rotate around the first rotation axis;
   an inner gimbal mounted on the outer gimbal, said inner gimbal configured to rotate around a second rotation axis that is either perpendicular or skew to the first rotation axis; and
   a first optics assembly mounted on the inner gimbal, said first optics assembly configured with an optical aperture offset radially from the first rotation axis and symmetric about the second rotation axis to receive optical radiation in a field-of-view (FOV) along a first optical axis, wherein rotation of said inner and outer gimbals about said second and first rotation axes traces the FOV over a field-of-regard (FOR) such that the FOV does not cross the central axis within the dome for any allowed rotation of the outer or inner gimbals,
   wherein no optics assembly is mounted on the inner gimbal having a FOV that crosses the first rotation axis within the dome for any allowed rotation of the outer or inner gimbals.

2. The two-axis gimbaled optical system of claim 1, wherein the conformal dome has a tip or extruded forebody that extends forward from the dome along the first rotation axis, wherein the FOV does not cross the tip or extruded forebody for any allowed rotation of the outer and inner gimbals.

3. The two-axis gimbaled optical system of claim 1, further comprising:
   a second optics assembly mounted on the inner gimbal to rotate about the second rotation axis, said second optics assembly configured with an optical aperture offset radially from the first rotation axis and symmetric about the second rotation axis to transmit or receive optical radiation in a FOV along a second optical axis, wherein rotation of the inner and outer gimbals traces the second optics assembly's FOV over a FOR such that the FOV does not cross the first rotation axis within the dome for any allowed rotation of the outer and inner gimbals.

4. The two-axis gimbaled optical system of claim 3, wherein said first and said second axes lie in the same plane and are perpendicular to each other, wherein said first and second optics assemblies are offset radially along the second rotation axis on opposite sides of the first rotation axis.

5. The two-axis gimbaled optical system of claim 4, further comprising:
   a fixed optic assembly mounted off of the inner gimbal between said first and second optics assemblies, said fixed optic having a FOV that overlaps the central axis within the dome.

6. The two-axis gimbaled optical system of claim 1, wherein said first and said second rotation axes lie in the same plane and are perpendicular to each other, wherein said first rotation axis is a roll axis and said rotation axis is a nod axis.

7. The two-axis gimbaled optical system of claim 6, further comprising:
   an off-gimbal optical component; and
   a coudé path that optically couples the optics assembly on the inner gimbal to the off-gimbal optical component, said coudé path comprising a first fold mirror on the optics assembly to direct light along the second rotation axis and a second fold mirror at the intersection of the first and second rotation axes to direct light along the first rotation axis.

8. The two-axis gimbaled optical system of claim 1, wherein said inner gimbal is offset radially on the outer gimbal.

9. The two-axis gimbaled optical system of claim 1, wherein the dome comprises a conformal dome having curved inner and outer surfaces that are symmetric about the first rotation axis, further comprising:
   an optical corrector mounted on said outer gimbal, said optical corrector adjacent the curved inner surface of the conformal dome in an optical path between the dome and the offset position of the first optics assembly's optical aperture that encompasses the FOV as the inner gimbal rotates about the second rotation axis, the optical corrector comprising an aspheric transparent arch having an optical corrector shape and position responsive to a shape of the dome at the offset position of the first optics assembly.

10. The two-axis gimbaled optical system of claim 9, wherein said first and said second rotation axes lie in a plane and perpendicular to each other, wherein said optical corrector shape is a full-arch that is only symmetric about the plane.

11. The two-axis gimbaled optical system of claim 9, wherein said first and second rotation axes are skew, wherein said optical corrector shape is approximately a half-arch that is only symmetric about a plane in which said first rotation axis lies and that is orthogonal to said second rotation axis.

12. The two-axis gimbaled optical system of claim 9, wherein said first and second rotation axes are skew, wherein said optical corrector shape is a full arch that is asymmetric about all planes.

13. A two-axis gimbaled optical system, comprising:
   a dome that is symmetric about a first rotation axis;
   an outer gimbal positioned behind the dome, said outer gimbal configured to rotate around the first rotation axis;
   one or more inner gimbals on the outer gimbal, said one or more inner gimbals configured to rotate around one or more inner rotation axes that are either perpendicular or skew to the first rotation axis;
   a first optics assembly mounted on one of the inner gimbals, said first optics assembly configured with a first optical aperture offset radially from the first rotation axis and symmetric about its inner rotation axes to or receive optical radiation in a first field-of-view (FOV) along a first optical axis; and
   a second optics assembly mounted on one of the inner gimbals, said second optics assembly configured with a second optical aperture offset radially from the first rotation axis and symmetric about its inner rotation axes to transmit or receive optical radiation in a second FOV along a second optical axis;

wherein rotation of the outer gimbal and the one or more inner gimbals traces the first and second FOV such that neither the first or second FOV cross the first rotation axis within the dome for any allowed rotation of the outer or one or more inner gimbals;

wherein no optics assembly is mounted on the inner gimbal having a FOV that crosses the first rotation axis within the dome for any allowable rotation of the outer or one or more inner gimbals.

14. The two-axis gimbaled optical system of claim 13, wherein said first and second optics assemblies are mounted on ene the same inner gimbal.

15. The two-axis gimbaled optical system of claim 13, wherein said first and second optics assemblies are mounted on different inner gimbals.

16. The two-axis gimbaled optical system of claim 13, wherein said dome comprises a conformal dome having curved inner and outer surfaces that are symmetric about the first rotation axis, said inner and outer gimbals positioned behind the conformal dome, said optical system further comprising:

a first optical corrector mounted on said outer gimbal, said first optical corrector adjacent the curved inner surface of the conformal dome in an optical path between the dome and the offset position of first optics assembly's first optical aperture that encompasses the FOV as its inner gimbal rotates about its inner rotation axis, the first optical corrector comprising an aspheric transparent arch having an optical corrector shape and position responsive to a shape of the dome at the offset position of the first optics assembly; and a second optical corrector mounted on said outer gimbal, said second optical corrector adjacent the curved inner surface of the conformal dome in an optical path between the dome and the offset position of second optics assembly's second optical that encompasses the FOV as its inner gimbal rotates about its inner rotation axis, the second optical corrector comprising an aspheric transparent arch having an optical corrector shape and position responsive to a shape of the dome at the offset position of the second optics assembly.

* * * * *